US012671993B2

(12) United States Patent
Gkellas et al.

(10) Patent No.: US 12,671,993 B2
(45) Date of Patent: Jun. 30, 2026

(54) SELECTION OF A SECURITY EDGE PROTECTION PROXY

(71) Applicant: Nokia Technologies Oy, Espoo (FI)

(72) Inventors: Georgios Gkellas, Petroupoli Attica (GR); Saurabh Khare, Bangalore (IN); Bruno Landais, Pleumeur-Bodou (FR)

(73) Assignee: Nokia Technologies Oy, Espoo (FI)

( * ) Notice: Subject to any disclaimer, the term of this patent is extended or adjusted under 35 U.S.C. 154(b) by 397 days.

(21) Appl. No.: 18/188,994

(22) Filed: Mar. 23, 2023

(65) Prior Publication Data

US 2023/0319568 A1    Oct. 5, 2023

(30) Foreign Application Priority Data

Mar. 29, 2022    (IN) ............................. 202241018382

(51) Int. Cl.
*H04W 60/04*    (2009.01)
*H04W 12/084*    (2021.01)
*H04W 84/04*    (2009.01)

(52) U.S. Cl.
CPC ......... *H04W 12/084* (2021.01); *H04W 60/04* (2013.01); *H04W 84/042* (2013.01)

(58) Field of Classification Search
CPC .............................. H04W 12/08; H04W 60/04
See application file for complete search history.

(56) References Cited

U.S. PATENT DOCUMENTS

| | | | |
|---|---|---|---|
| 11,770,694 B2 * | 9/2023 | Rajavelu ............... | H04W 12/12 |
| | | | 455/433 |
| 2021/0058784 A1 * | 2/2021 | Kedalagudde ........ | H04W 76/12 |
| 2022/0022040 A1 * | 1/2022 | Mahalank ............. | H04W 12/08 |

OTHER PUBLICATIONS

"3rd Generation Partnership Project; Technical Specification Group Core Network and Terminals; 5G System; Network Function Repository Services; Stage 3 (Release 17)", 3GPP TS 29.510, V17.4.0, Dec. 2021, pp. 1-284.

(Continued)

*Primary Examiner* — Michael T Vu
(74) *Attorney, Agent, or Firm* — Nokia Technologies Oy

(57)    ABSTRACT

There is provided an apparatus comprising at least one processor; and at least one memory storing instructions that, when executed by the at least one processor, cause the apparatus to perform at least: receiving from at least one security edge protection proxy, SEPP, a registration message indicative of at least: at least one remote public land mobile network, PLMN, and/or at least one remote stand-alone non-public network, SNPN, the at least one SEPP is connected to; at least one agreed interface purpose per remote PLMN and/or remote SNPN the at least one SEPP is connected to, wherein the interface purpose is a purpose of intended usage of a connection over an inter-network interface; receiving a discovery request for a SEPP, which is configured to support connecting to a target PLMN or SNPN for interface purpose or interface purposes specified in the discovery request; selecting, among the at least one SEPP, at least one SEPP configured to support connecting to the target PLMN or target SNPN for the interface purpose or interface purposes specified in the discovery request; and transmitting, in response to the discovery request, information on the selected at least one SEPP.

15 Claims, 7 Drawing Sheets

(56)     References Cited

OTHER PUBLICATIONS

"3rd Generation Partnership Project; Technical Specification Group Core Network and Terminals; 5G System; Public Land Mobile Network (PLMN) Interconnection; Stage 3 (Release 17)", 3GPP TS 29.573, V17.3.0, Dec. 2021, pp. 1-102.

"Usage indication over N32-c", 3GPP TSG-CT WG4 Meeting #108-e, C4-221574, NTT Docomo, Feb. 17-25, 2022, 12 pages.

"Usage indication over N32-f", 3GPP TSG-CT WG4 Meeting #108-e, C4-221642, NTT Docomo, Feb. 17-25, 2022, 10 pages.

"PLMN Specific N32-C connection", 3GPP TSG-CT WG4 Meeting #108-e, C4-221541, Nokia, Feb. 17-25, 2022, 6 pages.

"3rd Generation Partnership Project; Technical Specification Group Services and System Aspects; System architecture for the 5G System (5GS); Stage 2 (Release 17)", 3GPP TS 23.501, V17.3.0, Dec. 2021, pp. 1-559.

* cited by examiner

400 receiving, by a network repository function, from at least one security edge protection proxy, SEPP, a registration message indicative of at least:

- at least one remote public land mobile network, PLMN, and/or at least one remote stand-alone non-public network, SNPN, the at least one SEPP is connected to;

- at least one agreed interface purpose per remote PLMN and/or remote SNPN the at least one SEPP is connected to, wherein the interface purpose is a purpose of intended usage of a connection over an inter-network interface

410 receiving a discovery request for a SEPP, which is configured to support connecting to a target PLMN or SNPN for interface purpose or interface purposes specified in the discovery request

420 selecting, among the at least one SEPP, at least one SEPP configured to support connecting to the target PLMN or target SNPN for the interface purpose or interface purposes specified in the discovery request

430 transmitting, in response to the discovery request, information on the selected at least one SEPP

500 transmitting, by a network function consumer or a service communication proxy associated with the network function consumer, to a network repository function, a discovery request for a SEPP, which supports connecting to a target PLMN or target SNPN for one or more interface purposes specified in the discovery request, wherein the interface purpose is a purpose of intended usage of a connection over an inter-network interface

510 receiving information on selected at least one SEPP configured to support connecting to the target PLMN or target SNPN for the one or more interface purposes specified in the discovery request

600 transmitting, by a security edge protection proxy, to a network repository function, a registration message indicative of at least:

- at least one remote public land mobile network, PLMN, and/or at least one remote stand-alone non-public network, SNPN, the apparatus is connected to; and

- at least one agreed interface purpose per remote PLMN and/or remote SNPN the apparatus is connected to, wherein the interface purpose is a purpose of intended usage of a connection over an inter-network interface

610 transmitting, by the security edge protection proxy, to the network repository function, an update message indicative of any change compared to information included in the registration message and/or a previous update message

710 Initiating SEPP

720 Responding SEPP

712 SecNegotiateReqData{SNPN list})

714 SecNegotiateRspData{SNPN list})

SELECTION OF A SECURITY EDGE PROTECTION PROXY

FIELD

Various example embodiments relate to selection of a network edge device, such as, for example, a gateway or a security edge protection proxy, SEPP.

BACKGROUND

In roaming, a user device such as a mobile phone is used outside the range of its native network, or home public land mobile network (HPLMN), and connected to another network, visiting public land mobile network (VPLMN). A network edge device, such as a security edge protection proxy (SEPP), is part of the roaming security architecture. Signalling traffic between the networks is expected to pass through SEPPs.

SUMMARY

According to some aspects, there is provided the subject-matter of the independent claims. Some example embodiments are defined in the dependent claims.

According to a first aspect, there is provided an apparatus comprising at least one processor; and at least one memory storing instructions that, when executed by the at least one processor, cause the apparatus to perform at least: receiving from at least one security edge protection proxy, SEPP, a registration message indicative of at least: at least one remote public land mobile network, PLMN, and/or at least one remote stand-alone non-public network, SNPN, the at least one SEPP is connected to; at least one agreed interface purpose per remote PLMN and/or remote SNPN the at least one SEPP is connected to, wherein the interface purpose is a purpose of intended usage of a connection over an inter-network interface; receiving a discovery request for a SEPP, which is configured to support connecting to a target PLMN or SNPN for interface purpose or interface purposes specified in the discovery request; selecting, among the at least one SEPP, at least one SEPP configured to support connecting to the target PLMN or target SNPN for the interface purpose or interface purposes specified in the discovery request; and transmitting, in response to the discovery request, information on the selected at least one SEPP.

According to a second aspect, there is provided an apparatus comprising at least one processor; and at least one memory storing instructions that, when executed by the at least one processor, cause the apparatus to perform at least: transmitting, to a network repository function, a discovery request for a SEPP, which supports connecting to a target PLMN or target SNPN for one or more interface purposes specified in the discovery request, wherein the interface purpose is a purpose of intended usage of a connection over an inter-network interface; and receiving information on selected at least one SEPP configured to support connecting to the target PLMN or target SNPN for the one or more interface purposes specified in the discovery request.

According to a third aspect, there is provided an apparatus comprising at least one processor; and at least one memory storing instructions that, when executed by the at least one processor, cause the apparatus to perform at least: transmitting, to a network repository function, a registration message indicative of at least: at least one remote public land mobile network, PLMN, and/or at least one remote stand-alone non-public network, SNPN, the apparatus is connected to;

and at least one agreed interface purpose per remote PLMN and/or remote SNPN the apparatus is connected to, wherein the interface purpose is a purpose of intended usage of a connection over an inter-network interface.

According to a fourth aspect, there is provided a method, comprising: receiving, by a network repository function, from at least one security edge protection proxy, SEPP, a registration message indicative of at least: at least one remote public land mobile network, PLMN, and/or at least one remote stand-alone non-public network, SNPN, the at least one SEPP is connected to; and at least one agreed interface purpose per remote PLMN and/or remote SNPN the at least one SEPP is connected to, wherein the interface purpose is a purpose of intended usage of a connection over an inter-network interface; receiving a discovery request for a SEPP, which is configured to support connecting to a target PLMN or SNPN for interface purpose or interface purposes specified in the discovery request; selecting, among the at least one SEPP, at least one SEPP configured to support connecting to the target PLMN or target SNPN for the interface purpose or interface purposes specified in the discovery request; and transmitting, in response to the discovery request, information on the selected at least one SEPP.

According to a fifth aspect, there is provided a method, comprising: transmitting, by a network function consumer or a service communication proxy associated with the network function consumer, to a network repository function, a discovery request for a SEPP, which supports connecting to a target PLMN or target SNPN for one or more interface purposes specified in the discovery request, wherein the interface purpose is a purpose of intended usage of a connection over an inter-network interface; and receiving information on selected at least one SEPP configured to support connecting to the target PLMN or target SNPN for the one or more interface purposes specified in the discovery request.

According to a sixth aspect, there is provided a method, comprising: transmitting, by a security edge protection proxy, to a network repository function, a registration message indicative of at least: at least one remote public land mobile network, PLMN, and/or at least one remote stand-alone non-public network, SNPN, the apparatus is connected to; and at least one agreed interface purpose per remote PLMN and/or remote SNPN the apparatus is connected to, wherein the interface purpose is a purpose of intended usage of a connection over an inter-network interface.

According to a seventh aspect, there is provided a non-transitory computer readable medium comprising program instructions that, when executed by at least one processor, cause an apparatus to at least to perform the method of the fourth aspect and any of the embodiments thereof.

According to an eighth aspect, there is provided a non-transitory computer readable medium comprising program instructions that, when executed by at least one processor, cause an apparatus to at least to perform the method of the fifth aspect and any of the embodiments thereof.

According to a ninth aspect, there is provided a non-transitory computer readable medium comprising program instructions that, when executed by at least one processor, cause an apparatus to at least to perform the method of the sixth aspect and any of the embodiments there of.

According to a tenth aspect, there is provided a computer program configured to cause an apparatus to, when executed by the apparatus, perform at least the method of the fourth aspect and any of the embodiments thereof.

According to an eleventh aspect, there is provided a computer program configured to cause an apparatus to, when executed by the apparatus, perform at least the method of the fifth aspect and any of the embodiments thereof.

According to a twelfth aspect, there is provided a computer program configured to cause an apparatus to, when executed by the apparatus, perform at least the method of the sixth aspect and any of the embodiments thereof.

According to a further aspect, there is provided an apparatus comprising means for performing at least: receiving from at least one security edge protection proxy, SEPP, a registration message indicative of at least: at least one remote public land mobile network, PLMN, and/or at least one remote stand-alone non-public network, SNPN, the at least one SEPP is connected to; at least one agreed interface purpose per remote PLMN and/or remote SNPN the at least one SEPP is connected to, wherein the interface purpose is a purpose of intended usage of a connection over an inter-network interface; receiving a discovery request for a SEPP, which is configured to support connecting to a target PLMN or SNPN for interface purpose or interface purposes specified in the discovery request; selecting, among the at least one SEPP, at least one SEPP configured to support connecting to the target PLMN or target SNPN for the interface purpose or interface purposes specified in the discovery request; and transmitting, in response to the discovery request, information on the selected at least one SEPP.

According to a further aspect, there is provided an apparatus comprising means for performing at least: transmitting, to a network repository function, a discovery request for a SEPP, which supports connecting to a target PLMN or target SNPN for one or more interface purposes specified in the discovery request, wherein the interface purpose is a purpose of intended usage of a connection over an inter-network interface; and receiving information on selected at least one SEPP configured to support connecting to the target PLMN or target SNPN for the one or more interface purposes specified in the discovery request.

According to a further aspect, there is provided an apparatus comprising means for performing at least: transmitting, to a network repository function, a registration message indicative of at least: at least one remote public land mobile network, PLMN, and/or at least one remote stand-alone non-public network, SNPN, the apparatus is connected to; and at least one agreed interface purpose per remote PLMN and/or remote SNPN the apparatus is connected to, wherein the interface purpose is a purpose of intended usage of a connection over an inter-network interface.

According to a further aspect, there is provided an apparatus comprising means for performing at least: transmitting, by a security edge protection proxy to another security edge protection proxy, a request for security capability exchange indicative of at least one SNPN identities associated with the transmitting security edge protection proxy; receiving, from the other security edge protection proxy, a response indicative of at least one SNPN identities associated with the other security edge protection proxy; and storing the at least one SNPN identities.

According to an embodiment, the means comprises at least one processor; and at least one memory storing instructions that, when executed by the at least one processor, cause the performance of the apparatus.

BRIEF DESCRIPTION OF THE DRAWINGS

FIG. 4 shows, by way of example, a flowchart of a method;

FIG. 5 shows, by way of example, a flowchart of a method;

FIG. 6 shows, by way of example, a flowchart of a method;

DETAILED DESCRIPTION

A network repository function (NRF) may receive a discovery request for a SEPP configured to support some specific interface purpose, e.g. N32 purpose, which is a purpose of intended usage of a connection over an inter-network interface, e.g. N32 interface. Based on information received from SEPPs, the NRF may select a suitable SEPP for a specified interface purpose.

Figure 1:
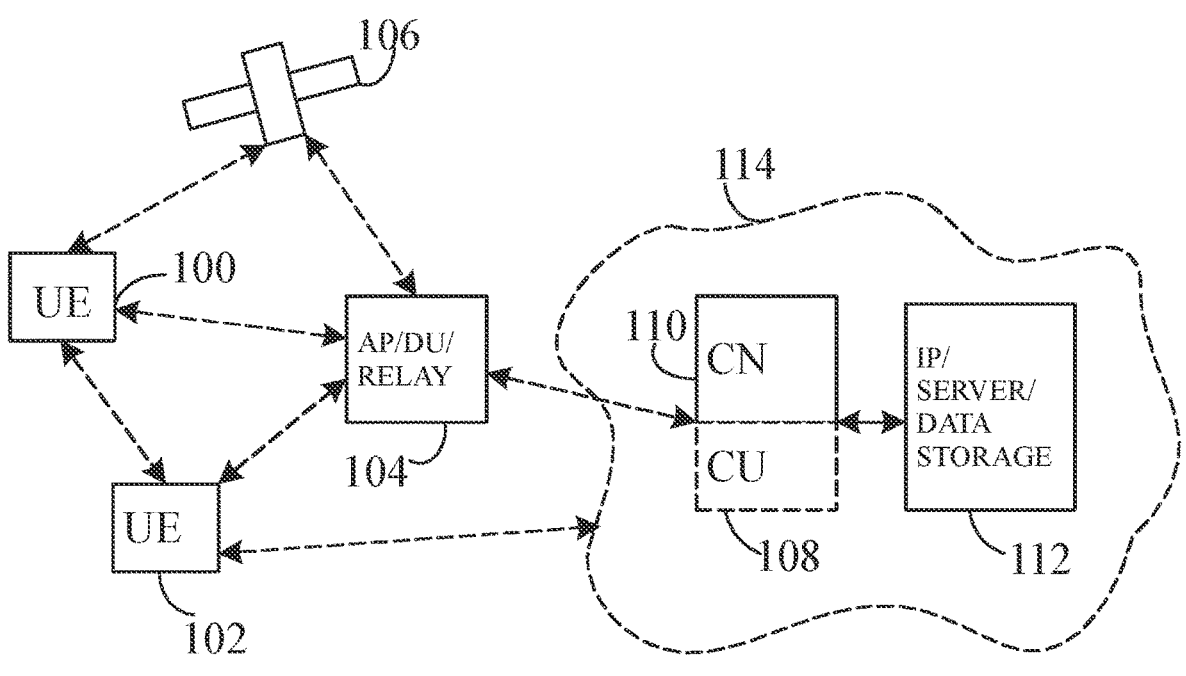
FIG. 1 shows, by way of example, a network architecture of communication system.

FIG. 1 shows, by way of an example, a network architecture of communication system. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The example of FIG. 1 shows a part of an exemplifying radio access network. FIG. 1 shows user devices 100 and 102 configured to be in a wireless connection on one or more communication channels in a cell with an access node, such as gNB, i.e. next generation NodeB, or eNB, i.e. evolved NodeB (eNodeB), 104 providing the cell. The physical link from a user device to the network node is called uplink (UL) or reverse link and the physical link from the network node to the user device is called downlink (DL) or forward link. It should be appreciated that network nodes or their functionalities may be implemented by using any node, host, server or access point etc. entity suitable for such a usage. A communications system typically comprises more than one network node in which case the network nodes may also be configured to communicate with one another over links, wired or wireless, designed for the purpose. These links may be used for signalling purposes. The network node is a computing device configured to control the radio resources of the communication system it is coupled to. The network node may also be referred to as a base station (BS), an access point or any other type of interfacing device including a relay station capable of operating in a wireless environment. The network node includes or is coupled to transceivers. From the transceivers of the network node, a connection is provided to an antenna unit that establishes bi-directional radio links to user devices. The antenna unit may comprise a plurality of antennas or antenna elements. The network node is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), or their 5G core counterparts like the access and mobility management function (AMF), the session management function (SMF), the user plane function (UPF), etc. An example of the network node configured to operate as a relay station is integrated access and backhaul node (IAB). The distributed unit (DU) part of the IAB node performs BS functionalities of the IAB node, while the backhaul connection is carried out by the mobile termination (MT) part of the IAB node. UE functionalities may be carried out by IAB MT, and BS functionalities may be carried out by IAB DU. Network architecture may comprise a parent node, i.e. IAB donor, which may have wired connection with the CN, and wireless connection with the IAB MT.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

Additionally, although the apparatuses have been depicted as single entities, different units, processors and/or memory units (not all shown in FIG. 1) may be implemented inside these apparatuses, to enable the functioning thereof.

5G enables using multiple input-multiple output (MIMO) technology at both UE and gNB side, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 7 GHz, cmWave and mmWave, and also being integratable with existing legacy radio access technologies, such as the LTE. Below 7 GHz frequency range may be called as FR1, and above 24 GHz (or more exactly 24-52.6 GHz) as FR2, respectively. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 7 GHz-cmWave, below 7 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular megaconstellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite.

In roaming, a user device such as a mobile phone is used outside the range of its native network, or home public land mobile network (HPLMN), and connected to another network, visiting public land mobile network (VPLMN). Security edge protection proxy (SEPP) is part of the roaming security architecture. Signalling traffic between the networks is expected to pass through SEPPs. Interface between the SEPPs of a VPLMN and a HPLMN in roaming scenarios is the N32 interface.

3$^{rd}$ generation partnership project (3GPP) has specified N32 to be considered as two separate interfaces, the control plane interface N32-c and the forwarding interface N32-f. N32-c is an interface between the SEPPs for performing the initial handshake and negotiating the parameters to be applied for the actual N32 message forwarding. N32-f is used for forwarding the communication between the Network Function (NF) service consumer and the NF service producer after applying the application level security (ALS, also known as protocol for N32 interconnect security, PRINS) protection or transport layer security (TLS) protection.

An initiating SEPP is the SEPP that initiates the security capability negotiation procedure towards a responding SEPP to agree on a security mechanism to use for protecting NF service related signalling over an interface, e.g. N32-f interface. When the initiating SEPP and the responding SEPP perform a security capability negotiation procedure, the purpose of the intended usage of N32 connection may be communicated in the negotiation procedure, for example in a request from the initiating SEPP to the responding SEPP. On successful processing of the request, the responding SEPP may respond to the initiating SEPP and include the purpose of the accepted usage of N32 connection into the response, for example. The purpose may be e.g. roaming, inter-PLMN mobility, roaming testing, inter-PLMN mobility testing, inter-PLMN signalling, short message service (SMS) interconnect. In case no purposes are exchanged, the responding SEPP may assume by default that purposes are for roaming and inter-PLMN mobility, for example. By inter-PLMN mobility it is meant that a subscriber moves between two PLMNs.

A SEPP may be able to use one or more PLMN identities, PLMN IDs, of the PLMN in which it is comprised. In a situation where a PLMN is using more than one PLMN ID, the PLMN's SEPP may use the same N32-connection for all of the PLMN's PLMN IDs. If different PLMNs are represented by different PLMN IDs supported by a SEPP, the SEPP may use separate N32-connections for each pair of HPLMN and VPLMN.

It may be assumed that every SEPP in a PLMN supports every interface purpose, e.g. N32 purpose, that is, roaming, inter-PLMN signalling, SMS interconnect, test, etc. In practice, the operators may deploy purpose specific SEPPs whereby not all SEPPs are required to support every interface purpose, e.g. N32 purpose. For example, an operator may use a specific SEPP for test users or SMS traffic. For example, a first SEPP (SEPP1) may be used for SMS interconnect, and a second SEPP (SEPP2) may be used for testing, and a third SEPP (SEPP3) may be used for roaming.

Enabling deployments with dedicated SEPPs for different interface purposes, e.g. N32 purposes, would provide additional flexibility to operators. For example, SEPP1 and SEPP2 may be connected to PLMN1, PLMN2 and PLMN3 (hub use-cases). Different purposes may be supported per target PLMN.

For example, SEPP1 may support interconnect and SMS traffic towards PLMN1, and roaming towards PLMN2 and PLMN3; SEPP2 may support roaming towards PLMN1, and interconnect and SMS traffic towards PLMN2 and PLMN3 (or any other combination).

As another example, SEPP1 may support interconnect and SMS traffic towards PLMN1, PLMN2 and PLMN3; SEPP2 may support roaming towards PLMN1 and PLMN2; SEPP3 may support roaming towards PLMN3.

Thus, there are provided ways to enhance the SEPP discovery and selection, and SEPP profile, based on connected target PLMN or stand-alone non-public network (SNPN) and its specific interface purpose, e.g. N32 purpose. The interface purpose, e.g. N32 purpose, is a purpose of intended usage of a connection over an inter-network interface, e.g. N32 interface. The inter-network interface, e.g.

N32 interface, is configured to allow such usage when communicating with the target PLMN or SNPN.

Figure 2:
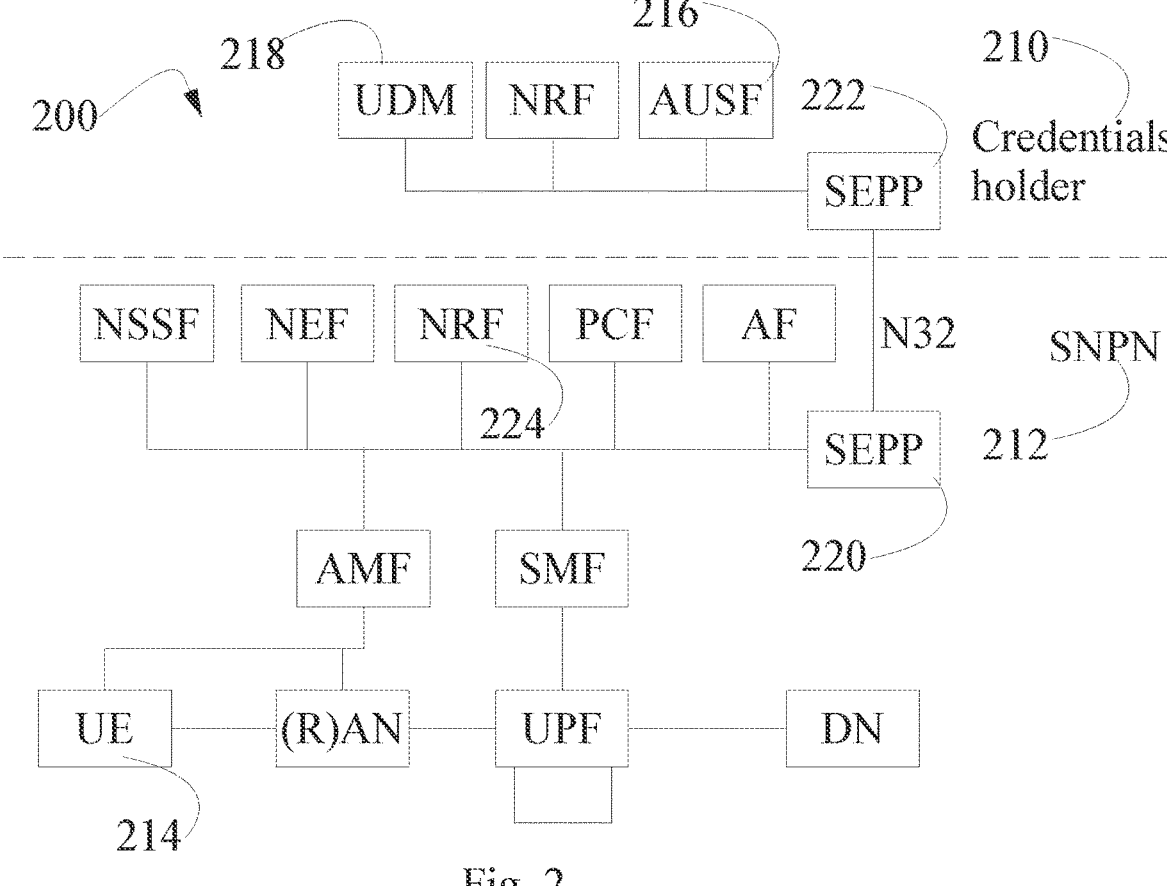
FIG. 2 shows, by way of example, a system architecture for a stand-alone non-public network with credentials holder.

FIG. 2 shows, by way of example, a system architecture 200 for a stand-alone non-public network (SNPN) 212 with credentials holder 210. The system may be the 5G system. The SNPN 212 supports primary authentication and authorization of UEs 214 that use credentials from a credentials holder 210 using authentication server function, AUSF, 216 and unified data management, UDM, 218. The credentials holder 210 may be a PLMN or SNPN. The N32 interface may be deployed between the SEPP 220 of the SNPN 212 and the SEPP 222 of the credentials holder 210 being the PLMN or SNPN.

Figure 3:
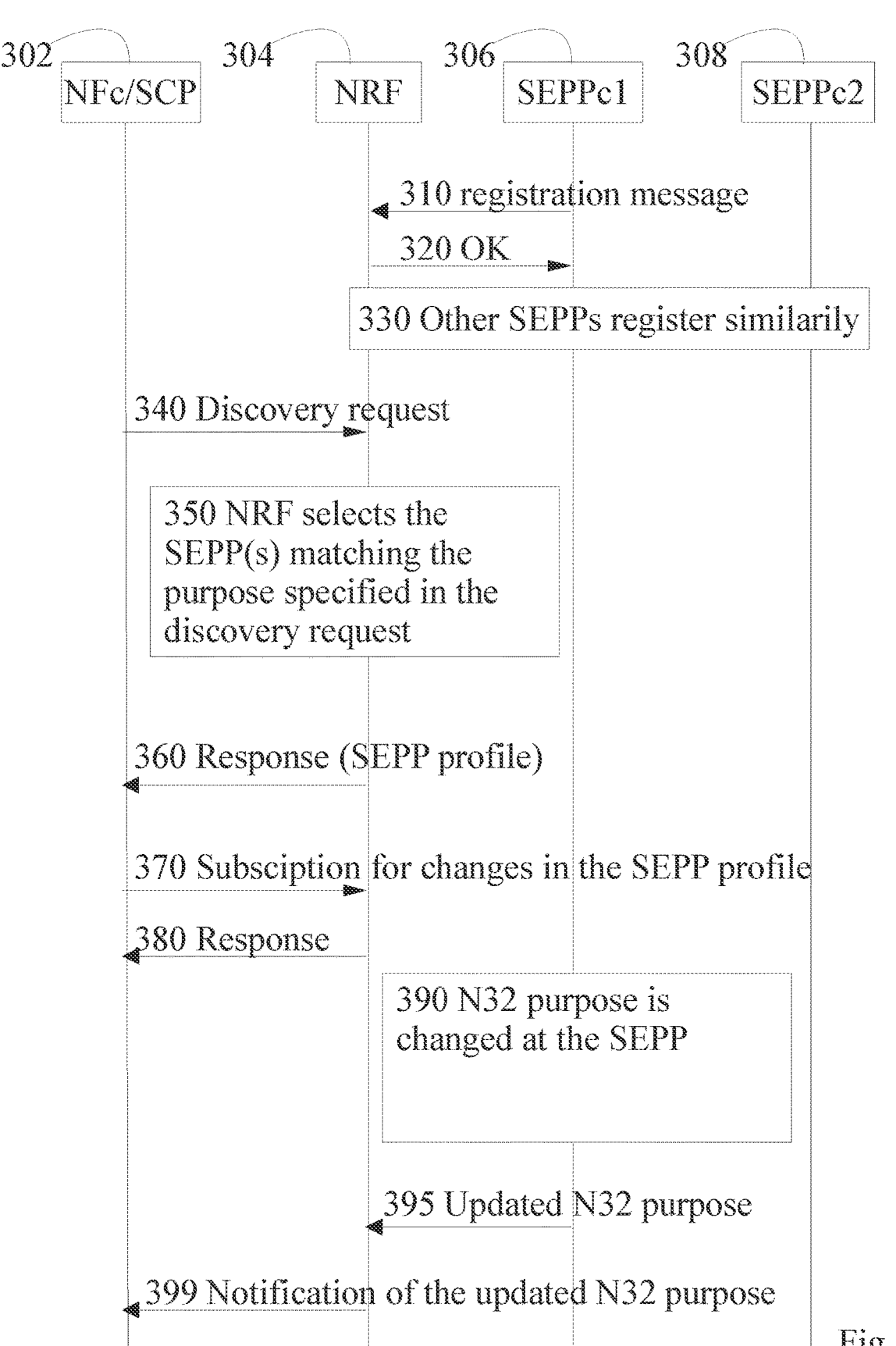
FIG. 3 shows, by way of example, signalling between entities.

FIG. 3 shows, by way of example, signalling between entities. A network repository function (NRF) 304 may be, for example, the NRF 224 of the example of FIG. 2, and SEPP consumer 306 may be, for example, the SEPP 220 of the example of FIG. 2. The NRF 304 receives from at least one SEPP 306, 308, e.g. SEPP consumer, SEPPc1, a message 310, such as a registration message, e.g. Nnrf_NFManagement_RegistrationNFProfile. The at least one SEPP may register its SEPP profile in the NRF using the registration message. The message may comprise, for example, SEPP information (Seppinfo). Seppinfo may comprise, for example, SEPP port number(s) for hypertext transfer protocol (HTTP) and/or hypertext transfer protocol secure (HTTPS), and a list of remote PLMNs reachable through the SEPP.

In addition, the registration message may comprise at least a list of remote SNPNs or identities of the SNPNs the SEPP is connected to, and a list of agreed interface purposes, e.g. N32 purposes, per remote PLMN and/or SNPN the SEPP is connected to. In the following, N32 purpose will be used as an example of the interface purpose.

In other words, the list of remote SNPNs the SEPP is connected to indicates the remote SNPNs reachable through the SEPP. The list may comprise one or more entries, that is, one or more identities of SNPNs (SNPN IDs) may be included in the list. Absence of this attribute (remoteSnpnList) may indicate that no SNPN is reachable through the SEPP.

The list of agreed N32 purposes, comprises the list of negotiated or agreed purposes per remote PLMN ID or SNPN ID. This attribute (n32Purposes) may be present if the SEPP supports purpose-specific negotiation. The list or a map may comprise, for example, one or more pairs of remote PLMN ID/SNPN ID and corresponding N32 purpose. The key of the map may be the remote PLMN ID or SNPN ID. The absence of this attribute may indicate that all purposes are supported towards the remote PLMN or SNPN.

The registration message may be further indicative of a list of agreed N32 purposes per pair of (source PLMN ID or source SNPN ID) and (target PLMN ID or target SNPN ID). This attribute (n32PurposesPerSourceNetworkId) may be present if SEPP supports purpose specific negotiation. The list or a map may comprise, for example, one or more pairs of (source PLMN ID/SNPN ID and target PLMN ID/SPN ID) and corresponding N32 purpose. The key of the map may be the source PLMN ID or source SNPN ID.

The NRF may confirm the registration to the SEPP by transmitting a confirmation response 320.

Other SEPPs, e.g. SEPPc2 308, may register 330 in a similar manner.

The NRF 304 may receive a discovery request 340 from NF consumer (NFc) or service communication proxy (SCP) 302 associated with the NFc. The discovery request may comprise, for example, query parameters indicating the NF type of the target NF being discovered and the NF type of the requester NF that is invoking the discovery service (Nnrf_NFDiscovery service). In the example of FIG. 3, the type of the target NF is SEPP.

The discovery request may be indicative of or indicate or comprise the requested N32 purpose(s) to be supported by the SEPP(s) for communication with the target PLMN and/or SNPN indicated in the discovery request. This attribute (target-n32-purpose) may comprise one or more entries.

The discovery request may be indicative of or indicate or comprise the requested N32 purpose(s) to be supported by the SEPP(s) for communication between a specific pair of source and target networks, which have been indicated or specified in the discovery request. This attribute (target-n32-purposes-per-network-pair) may define the source network (source PLMN ID or source SNPN ID), the target network (target PLMN ID or target SNPN ID), and the intended N32 purpose(s) for this pair of networks.

The discovery request may include a list of target PLMNs, when NF services in a different PLMN, or NF services of specific PLMN ID(s) in the same PLMN comprising multiple PLMN IDs, are to be discovered. This attribute (target-plmn-list) may comprise the PLMN ID of the target NF. If more than one PLMN ID is included, NFs from any PLMN ID present in the list matches the query parameter. This IE may also be included in SNPN scenarios, when the entity owning the subscription, that is, the credentials holder is a PLMN. For inter-PLMN service discovery, at most one PLMN ID shall be included in the list; it shall be included in the service discovery from the NF in the source PLMN sent to the NRF in the same PLMN, while it may be absent in the service discovery request sent from the source NRF to the target NRF.

The discovery request may include the PLMN ID and network identifier (NID) of the target NF, when NF services of a specific SNPN are to be discovered. This IE (target-snpn) may also be included in SNPN scenarios, when the entity owning the subscription, that is, the credentials holder is an SNPN.

Thus, the request 340 from the NFc/SCP 302 comprises a request for at least one SEPP, which supports the N32 purpose(s) specified in the request. For example, the discovery of the SEPP may be performed based on remote PLMN ID or remote SNPN ID and N32 purpose. Thus, the NRF receives a discovery request for a SEPP, which supports communicating with the target PLMN or SNPN for the N32 purpose(s) specified in the request. In other words, the intended N32 purpose(s) is/are defined in the discovery request.

The NRF selects 350, among the at least one SEPP that have registered in the NRF, at least one SEPP, which is configured to support the N32 purpose(s) specified in the request. The selected SEPP(s) support(s) N32 communication with the target PLMN or target SNPN for the requested purposes. In at least some embodiments, the selected SEPP(s) support(s) each N32 purpose specified in the request.

NRF 304 returns at least one SEPP matching the purpose(s) in the query. The NRF transmits information on the selected at least one SEPP. For example, the NRF may transmit a response 360 comprising the SEPP profile(s) of the selected SEPP(s) to the NFc/SCP 302.

The NFc/SCP 302 may subscribe to SEPP profile changes. The NRF 304 may receive a subscription 370 for changes in the information on the selected at least one SEPP or any other SEPP.

The NRF may confirm the subscription by transmitting a response 380.

Whenever there is a change 390 in the purpose, such as a negotiated purpose, at the SEPP 306, 308, the SEPP may update the purpose at the NRF. For example, the purpose may change via operations, administration and maintenance (OAM), or the purpose may be re-negotiated with the peer SEPP(s). The SEPP may then update its profile with a new remote PLMN specific negotiated or agreed N32 purpose. The profile may be updated whenever there is a change in any information included in the registration message. For example, the change may be in the list of the at least one remote PLMN and/or SNPN.

The NRF 304 may receive an update message, e.g. an indication 395 of an updated profile, e.g. of an updated N32 purpose, from the SEPP 306.

Then, the NRF 304 may send a notification 399 or indication of the updated SEPP profile, e.g. of the updated N32 purpose, to the NFc/SCP 302. The NFc/SCP 302 may then route subsequent inter-network signalling requests to the correct SEPP based on the new or updated information notified for the SEPP and the target PLMN/SNPN and the N32 purpose of the new requests.

Figure 4:
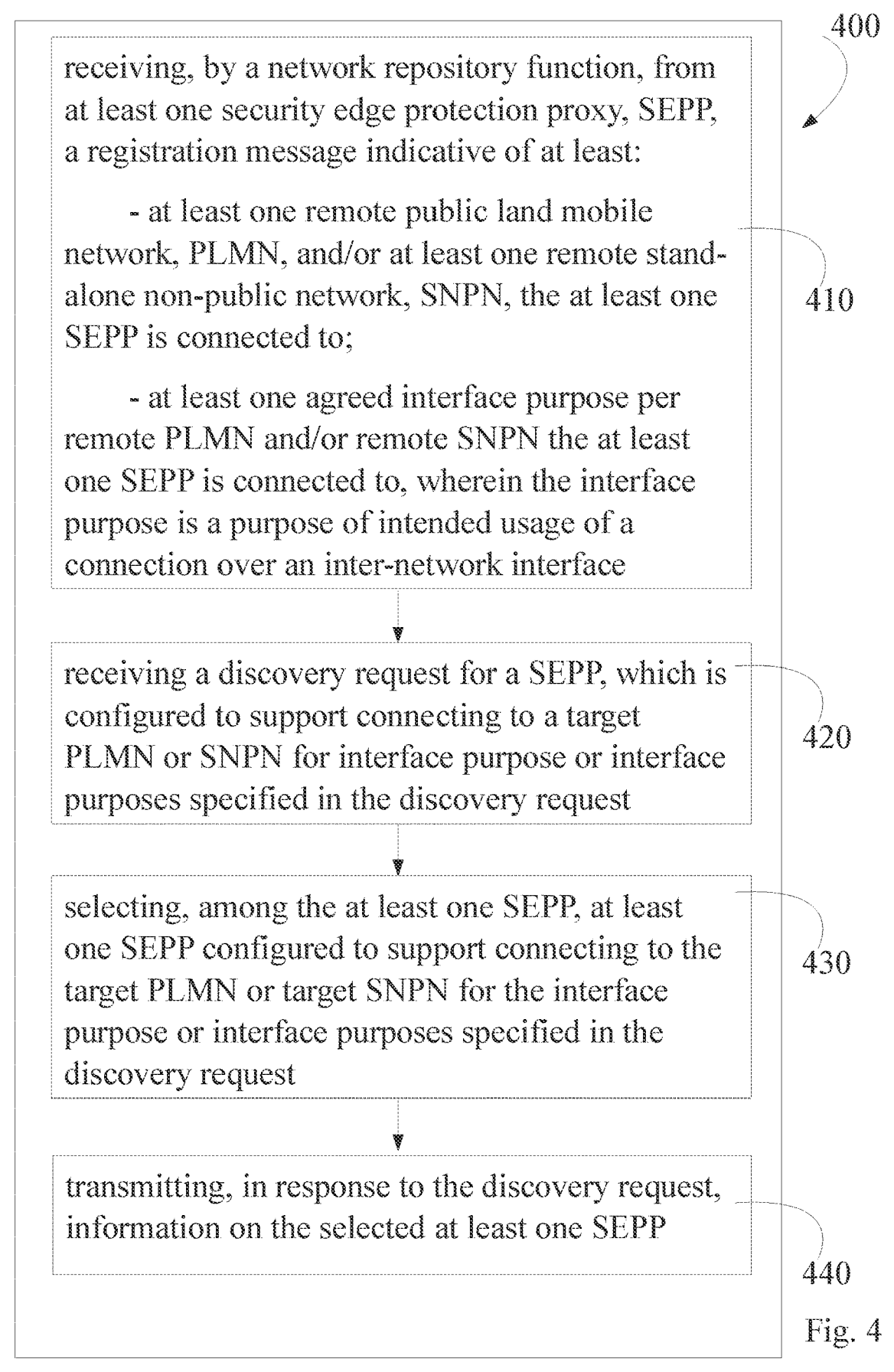

FIG. 4 shows, by way of example, a flowchart of a method 400. The phases of the illustrated method may be performed by a network repository function (NRF), or by a control device configured to control the functioning thereof, when installed therein. The method 400 comprises receiving 410, by a network repository function, from at least one security edge protection proxy, SEPP, a registration message indicative of at least: at least one remote public land mobile network, PLMN, and/or at least one remote stand-alone non-public network, SNPN, the at least one SEPP is connected to; and at least one agreed interface purpose per remote PLMN and/or remote SNPN the at least one SEPP is connected to, wherein the interface purpose is a purpose of intended usage of a connection over an inter-network interface. The method 400 comprises receiving 420 a discovery request for a SEPP, which is configured to support connecting to a target PLMN or SNPN for interface purpose or interface purposes specified in the discovery request. The method 400 comprises selecting 430, among the at least one SEPP, at least one SEPP configured to support connecting to the target PLMN or target SNPN for the interface purpose or interface purposes specified in the discovery request. The method 400 comprises transmitting 440, in response to the discovery request, information on the selected at least one SEPP.

Figure 5:
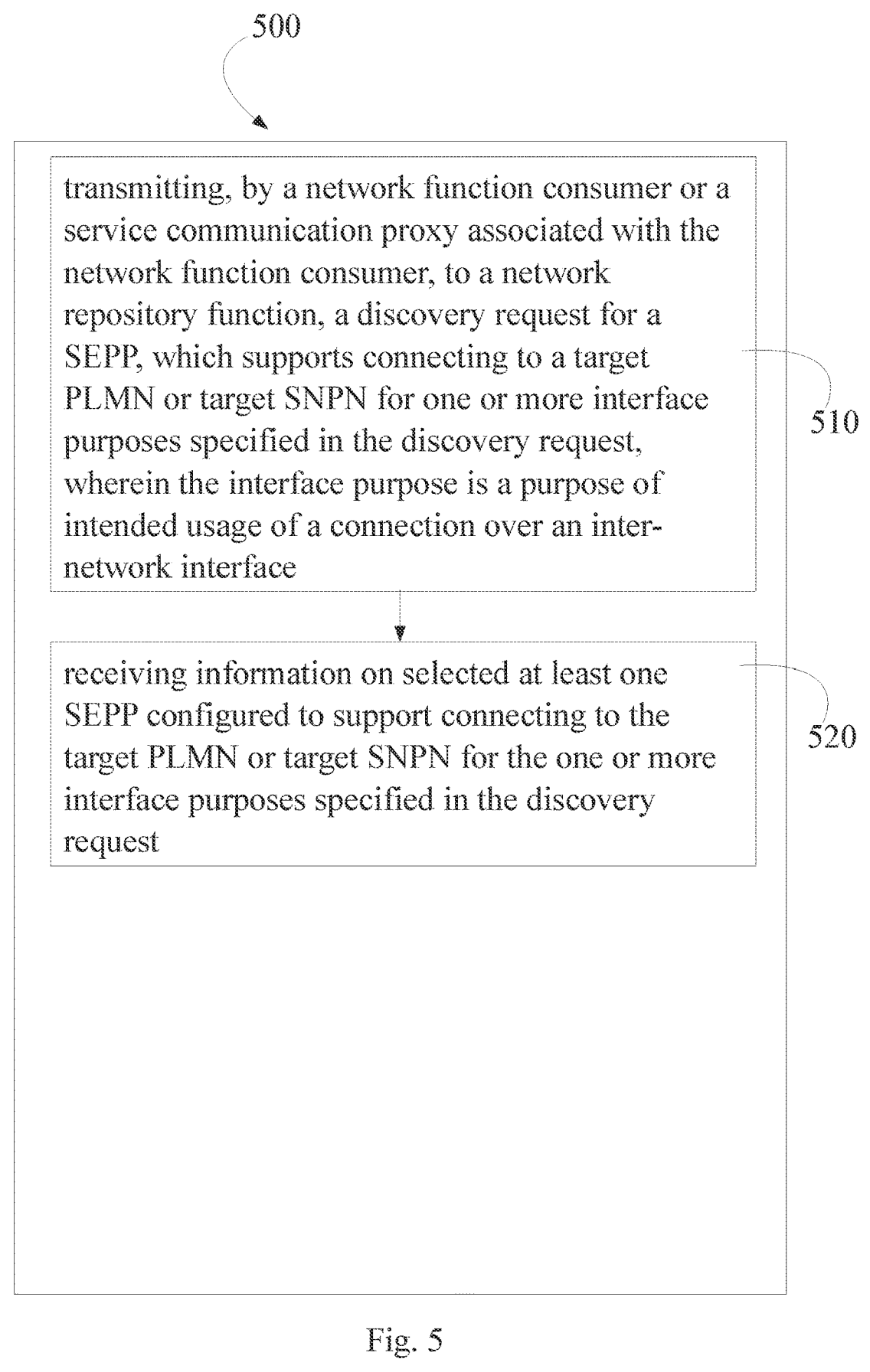

FIG. 5 shows, by way of example, a flowchart of a method 500. The phases of the illustrated method may be performed by a network function consumer (NFc) or a service communication proxy (SCP) associated with the NFc, or by a control device configured to control the functioning thereof, when installed therein. The method 500 comprises transmitting 510, by a network function consumer or a service communication proxy associated with the network function consumer, to a network repository function, a discovery request for a SEPP, which supports connecting to a target PLMN or target SNPN for one or more interface purposes specified in the discovery request, wherein the interface purpose is a purpose of intended usage of a connection over an inter-network interface. The method 500 comprises receiving 520 information on selected at least one SEPP configured to support connecting to the target PLMN or target SNPN for the one or more interface purposes specified in the discovery request.

Figure 6:
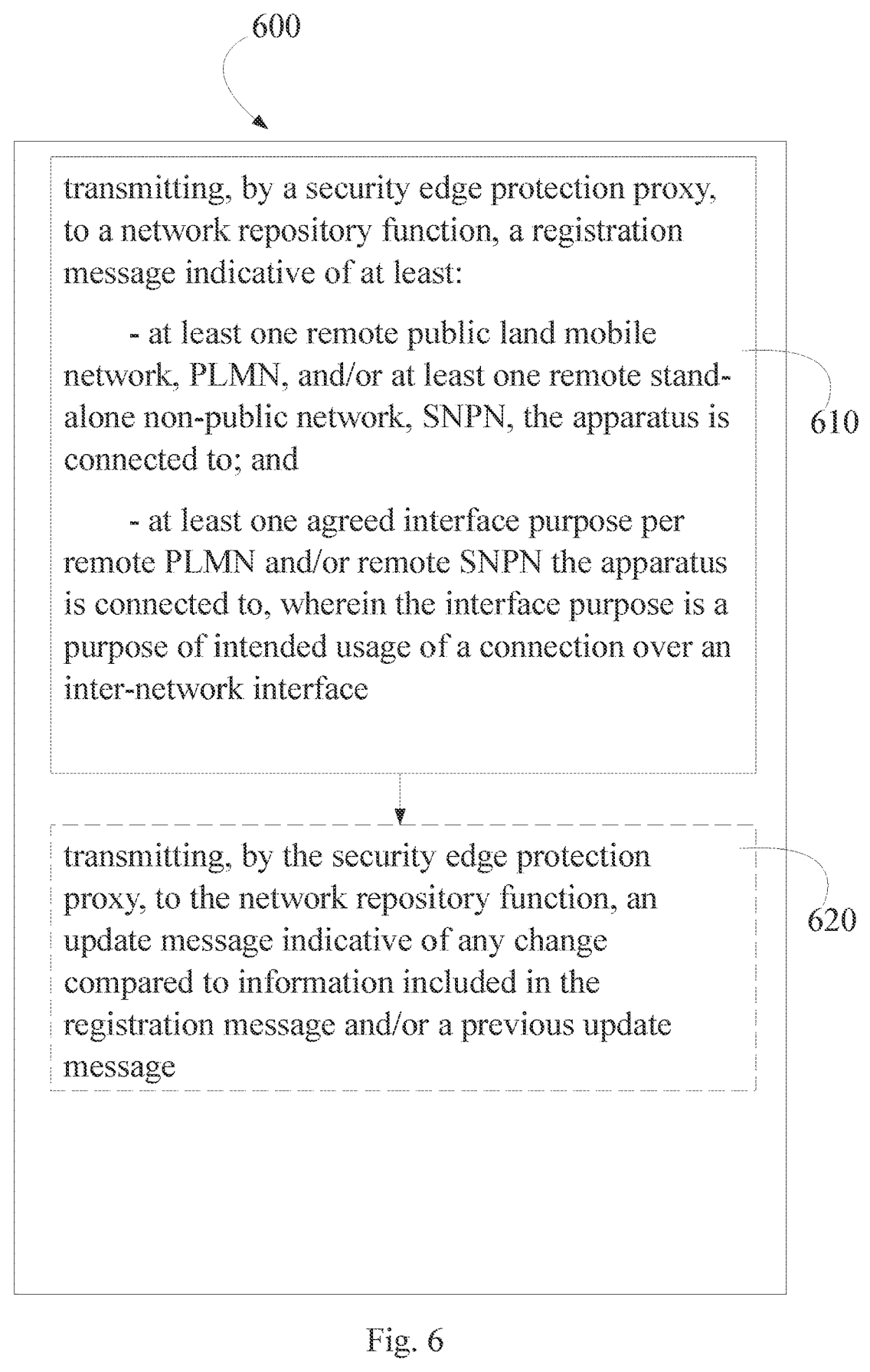

FIG. 6 shows, by way of example, a flowchart of a method 600. The phases of the illustrated method may be performed by a SEPP, or by a control device configured to control the functioning thereof, when installed therein. The method 600 comprises transmitting 610, by a security edge protection proxy, to a network repository function, a registration message indicative of at least: at least one remote public land mobile network, PLMN, and/or at least one remote stand-alone non-public network, SNPN, the apparatus is connected to; and at least one agreed interface purpose per remote PLMN and/or remote SNPN the apparatus is connected to, wherein the interface purpose is a purpose of intended usage of a connection over an inter-network interface.

The method 600 may comprise transmitting 620, by the security edge protection proxy, to the network repository function, an update message indicative of any change compared to the information included in the registration message and/or a previous update message. This enables the network repository function to be updated and hold the latest profile of the security edge protection proxy.

The method(s) as disclosed herein enable(s) the SEPPs to negotiate the purpose of an N32 connection, e.g. N32-c connection, established with an SNPN. The method(s) as disclosed herein enable(s) the SEPP to register in its profile, in the NRF, the remote SNPNs it connects to. The method(s) as disclosed herein enable(s) a network function, e.g. NFc/SCP, in an SNPN to discover, based on N32 purpose, the SEPP it should contact to send signalling to a remote SNPN. Referring to FIG. 2 and a case wherein a specific SEPP should be used, for example, for test subscribers using subscription permanent identifier (SUPI), the SEPP is enabled to register the purpose(s) it supports for an N32 connection towards a remote SNPN.

Figure 7:
FIG. 7 shows, by way of example, signalling between SEPPs.

FIG. 7 shows, by way of example, signalling between initiating SEPP 710 and responding SEPP 720 over N32-c interface. The security capabilities are exchanged between the SEPPs 710, 720. The initiating SEPP transmits a request for security capability exchange 712 (SecNegotiateReq-Data) to the responding SEPP. The request may comprise, for example, sender ID identifying the SEPP that is sending the request, list of security capabilities that the requesting SEPP 710 supports, whether TLS is supported for N32-f message forwarding.

The request may be indicative of a list of PLMN IDs associated with the SEPP, which is sending the request.

The request may be indicative of a list of SNPN IDs associated with the SEPP, which is sending the request. The list is to be stored by the receiving SEPP 720 in a N32-f context.

The responding SEPP 720 may transmit a response 714 (SecNegotiateRspData) to the initiating SEPP 710. The response may comprise the corresponding IEs or attributes as the request 712. For example, the response may be indicative of a list of SNPN IDs associated with the SEPP 720, which is sending the response. The list is to be stored by the receiving SEPP 710 in a N32-f context.

The N32-c signalling of the example of FIG. 7 enable a SEPP to advertise to a peer SEPP that it supports an SNPN during the N32-c connection establishment.

At least some embodiments enable the SEPPs become aware of the agreed-upon PLMN and/or SNPN specific N32 purposes of other SEPPs via configuration, NRF discovery and/or during the N32-c establishment procedure. If a SEPP receives a message, from a legacy entity, wherein the N32 purpose identified in the message is not fitting the N32 purpose of the SEPP, it may redirect the message to an appropriate SEPP based on either discovery or configuration. The message may be, for example, SMS-related request identified by access protocol interface (API) supposed to be handled for the target PLMN by another SEPP.

Figure 8:
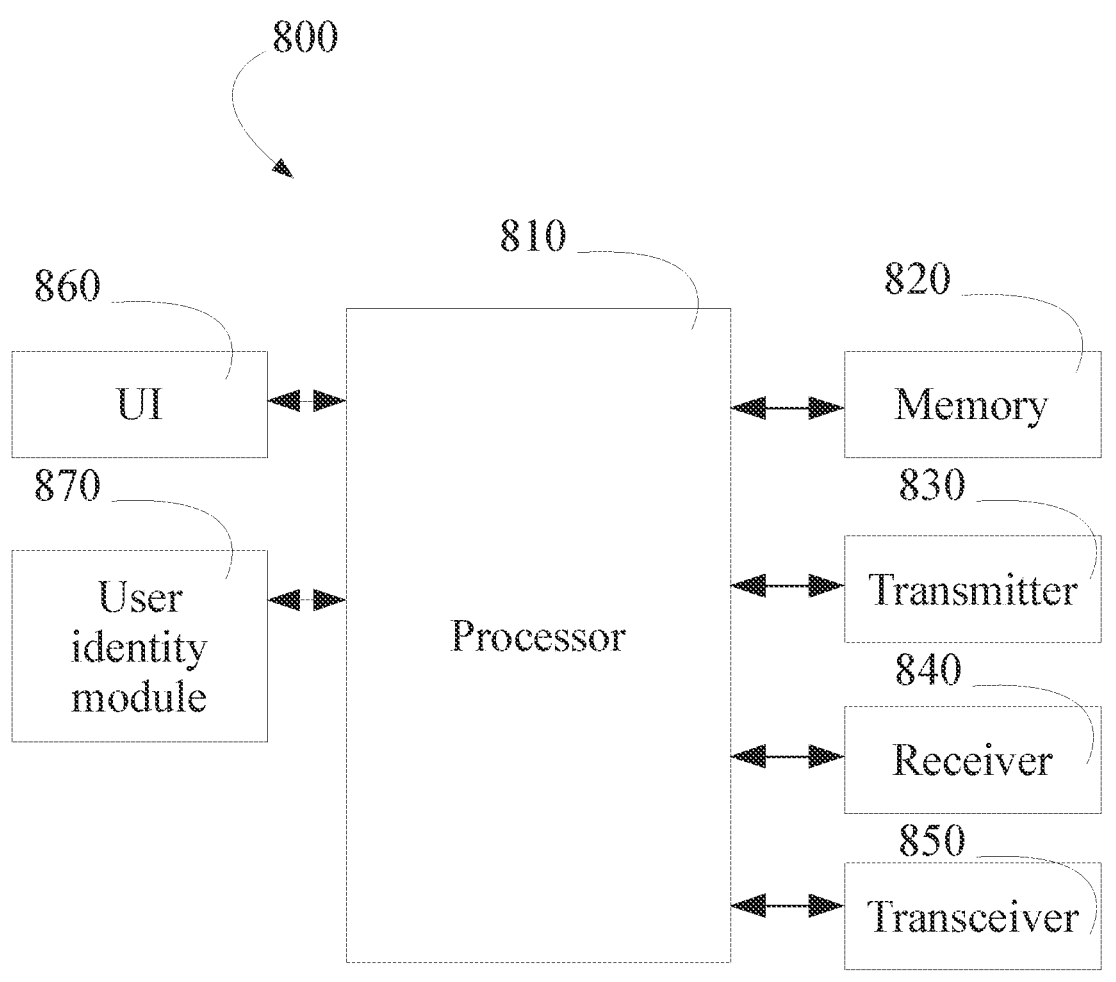
FIG. 8 shows, by way of example, a block diagram of an apparatus.

FIG. 8 shows, by way of example, a block diagram of an apparatus capable of performing methods as disclosed herein. Illustrated is device 800, which may comprise, for example, NRF 304, NFc/SCP 302 or SEPP 306, 308 of FIG. 3, or SEPP 710 of FIG. 7. Comprised in device 800 is processor 810, which may comprise, for example, a single-or multi-core processor wherein a single-core processor comprises one processing core and a multi-core processor comprises more than one processing core. Processor 810 may comprise, in general, a control device. Processor 810 may comprise more than one processor. Processor 810 may be a control device. A processing core may comprise, for example, a Cortex-A8 processing core manufactured by ARM Holdings or a Steamroller processing core designed by Advanced Micro Devices Corporation. Processor 810 may comprise at least one Qualcomm Snapdragon and/or Intel Atom processor. Processor 810 may comprise at least one application-specific integrated circuit, ASIC. Processor 810 may comprise at least one field-programmable gate array, FPGA. Processor 810 may be means for performing method steps in device 800. Processor 810 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a network function, to perform various functions) and (c) hardware circuit(s) and or processor(s), such as a micropro-cessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 800 may comprise memory 820. Memory 820 may comprise random-access memory and/or permanent memory. Memory 820 may comprise at least one RAM chip. Memory 820 may comprise solid-state, magnetic, optical and/or holographic memory, for example. Memory 820 may be at least in part accessible to processor 810. Memory 820 may be at least in part comprised in processor 810. Memory 820 may be means for storing information. Memory 820 may comprise computer instructions that processor 810 is configured to execute. When computer instructions configured to cause processor 810 to perform certain actions are stored in memory 820, and device 800 overall is configured to run under the direction of processor 810 using computer instructions from memory 820, processor 810 and/or its at least one processing core may be considered to be configured to perform said certain actions. Memory 820 may be at least in part external to device 800 but accessible to device 800.

Device 800 may comprise a transmitter 830. Device 800 may comprise a receiver 840. Transmitter 830 and receiver 840 may be configured to transmit and receive, respectively, information in accordance with at least one cellular or non-cellular standard. Transmitter 830 may comprise more than one transmitter. Receiver 840 may comprise more than one receiver. Transmitter 830 and/or receiver 840 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 800 may comprise a near-field communication, NFC, transceiver 850. NFC transceiver 850 may support at least one NFC technology, such as NFC, Bluetooth, Wibree or similar technologies.

Device 800 may comprise or connected to user interface, UI, 860. UI 860 may comprise at least one of a display, a keyboard, a touchscreen, a vibrator arranged to signal to a user by causing device 800 to vibrate, a speaker and a microphone. A user may be able to operate device 800 via UI 860, for example to accept incoming telephone calls, to originate telephone calls or video calls, to browse the Internet, to manage digital files stored in memory 820 or on a cloud accessible via transmitter 830 and receiver 840, or via NFC transceiver 850, and/or to play games.

Device 800 may comprise or be arranged to accept a user identity module 870. User identity module 870 may comprise, for example, a subscriber identity module, SIM, card installable in device 800. A user identity module 870 may comprise information identifying a subscription of a user of device 800. A user identity module 870 may comprise cryptographic information usable to verify the identity of a user of device 800 and/or to facilitate encryption of communicated information and billing of the user of device 800 for communication effected via device 800.

Processor 810 may be furnished with a transmitter arranged to output information from processor 810, via electrical leads internal to device 800, to other devices comprised in device 800. Such a transmitter may comprise a serial bus transmitter arranged to, for example, output information via at least one electrical lead to memory 820 for storage therein. Alternatively to a serial bus, the transmitter may comprise a parallel bus transmitter. Likewise processor 810 may comprise a receiver arranged to receive information in processor 810, via electrical leads internal to device 800, from other devices comprised in device 800. Such a receiver may comprise a serial bus receiver arranged to, for example, receive information via at least one electrical lead from receiver 840 for processing in processor 810. Alternatively to a serial bus, the receiver may comprise a parallel bus receiver.

Processor 810, memory 820, transmitter 830, receiver 840, NFC transceiver 850, UI 860 and/or user identity module 870 may be interconnected by electrical leads internal to device 800 in a multitude of different ways. For example, each of the aforementioned devices may be separately connected to a master bus internal to device 800, to allow for the devices to exchange information. However, as the skilled person will appreciate, this is only one example and depending on the embodiment various ways of interconnecting at least two of the aforementioned devices may be selected.

We claim:

1. An apparatus comprising:

at least one processor; and at least one memory storing instructions of a network repository function (NRF) of a communication network, wherein the instructions, when executed by the at least one processor, cause the apparatus to perform operations, the operation comprising at least:

receiving from each representative security edge proxty (SEPP) a plurality of security edge protection proxy (SEPPs), a respective registration message, wherein the respective registration message received from a respective SEPP of the plurality of SEPP comprises a request to register the respective SEPP with the NRF, and wherein the respective registration message comprises:

one or more identities of one or more remote mobile networks that the respective SEPP is connected to, wherein a respective identity of the one or more identities identifies a respective remote mobile network of the one or more remote mobile networks that the respective SEPP is connected to, wherein a respective remote mobile network comprises a remote public land mobile network (PLMN) that the respective SEPP is connected to or a remote standalone non-public network (SNPN) that the respective SEPP is connected to; and at least one agreed interface purpose per remote mobile network of the one or more remote mobile networks that the respective SEPP is connected to, wherein each respective agreed interface purpose of the at least one agreed interface purpose per remote mobile network comprises a purpose of intended usage of a connection of the respective SEPP over an inter-network interface;

registering the plurality of SEPPs by storing information about plurality of SEPP, wherein the information about the plurality of SEPPS comprises for each respective SEPP of the plurality of SEPPS, information about the respective SEPP that includes the one or more identities of the one or more remote mobile networks that the respective SEPP is connected to and the at least one agreed interface purpose per remote mobile network of the one or more remote networks that the respective SEPP is connected to;

receiving a discovery request for discovery of at least one SEPP of the plurality of SEPPs, the discovery request comprising an identity of target remote mobile network and at least one agreed interface purpose for the target remote network, wherein the target remote network is a target PLMN or a target SNPN;

selecting, from among the plurality of SEPP, the at least one SEPP of the plurality of SEPPs based on the information about the plurality of SEPPs, the identity of target remote mobile network included in the discovery request, and the at least one agreed interface purpose for the target remote network included in the discovery request, wherein the selecting comprises:

for each respective SEPP of the plurality of SEPPs:

determining whether the identity of the target mobile network matches the identity of a remote mobile network of the one or more remote mobile networks that the respective SEPP is connected to;

based on determining that the identity of the target mobile network matches the identity of a remote mobile network of the one or more remote mobile networks that the respective SEPP is connected to, determining whether the at least one agreed interface purpose for the target remote mobile network matches an interface purpose of the at least one agreed interface purpose for the remote mobile network; and based on determining that the at least one agreed interface purpose for the target remote mobile network matches the interface purpose of the at least one agreed interface purpose for the remote mobile network, selecting the respective SEPP; and transmitting, a response to the discovery request, the response comprising the information about each respective SEPP that is selected.

2. The apparatus of claim 1, wherein the operations further comprise:

receiving a subscription for notification of changes to the information about the least one SEPP.

3. The apparatus of claim 2, wherein the operations further comprise:

receiving, from the at least one SEPP, an indication of an update to at least one of the at least one agreed interface purpose per remote mobile network that the at least one SEPP is connected to; and transmitting a notification of the change to the information about the at least one SEPP.

4. The apparatus of claim 2, wherein the operations further comprise:

receiving, from a SEPP of the plurality of SEPP other than the at least one SEPP that is selected, an indication of an update to at least one of the at least one agreed interface purpose per remote mobile network that the SEPP is connected to; and transmitting a notification of the change to the information about the SEPP.

5. The apparatus of claim 3, wherein the operations further comprise:

receiving, from a SEPP of the plurality of SEPP other than the at least one SEPP that is selected, an indication of a change to the at least one remote mobile network that the SEPP is connected to; and transmitting a notification of the change to the information about the SEPP.

6. The apparatus of claim 1, wherein the discovery request is received from a network function consumer or a service communication proxy associated with the network function consumer.

7. The apparatus of claim 1, wherein the at least one agreed interface purpose per remote mobile network that the at least one SEPP is connected to comprises at least one of: roaming, inter-PLMN mobility, roaming testing, inter-PLMN mobility testing, inter-PLMN signalling, short message service, or interconnect.

8. A method comprising:

receiving from each respective security edge proxy (SEPP) of a plurality of security edge protection proxy (SEPPs), a respective registration message, wherein the respective registration message received from a respective SEPP of the plurality of SEPP comprises a request to register the respective SEPP with the NRF, and wherein the respective registration message comprises:

one or more identities of one or more remote mobile networks that the respective SEPP is connected to, wherein a respective identity of the one or more identities identifies a respective remote mobile network of the one remote mobile network that the respective SEPP is connected to, wherein a respective remote mobile network comprises a remote public land mobile network (PLMN) that the respective SEPP is connected to or a remote stand-alone non-public network (SNPN) that the respective SEPP is connected to; and at least one agreed interface purpose per remote mobile network of the one or more remote mobile network that the respective SEPP is connected to, wherein each respective agreed interface purpose of the at least one agreed interface purpose per remote mobile network comprises a purpose of intended usage of a connection of the respective SEPP over an inter-network interface;

registering the plurality of SEPPs by storing information about the plurality of SEPP, wherein the information about the plurality of SEPPs includes information about each respective SEPP of the plurality of SEPPs, wherein the information about a respective SEPP includes information about the respective SEPP that includes the one or more identities of the one or more remote mobile networks that the respective SEPP is connected to and the at least one agreed interface purpose per remote mobile network of the one or more remote networks that the respective SEPP is connected to;

receiving a discovery request for discovery of at least one SEPP of the plurality of SEPPs, the discovery request comprising an identity of target remote mobile network and at least one agreed interface purpose for the target remote network, wherein the target remote network is a target PLMN or a target SNPN;

selecting, from among the plurality of SEPP, the at least one SEPP of the plurality of SEPPs based on the information about the plurality of SEPPs the identity of the target mobile network included in the discovery, and the at least one agreed interface purpose for the target remote network included in the discovery request, wherein the selecting comprises:

for each respective SEPP of the plurality of SEPPs:

determining whether the identity of the target mobile network matches the identity of a remote mobile network of the one or more remote mobile networks that the respective SEPP is connected to;

based on determining that the identity of the target mobile network matches the identity of a remote mobile network of the one or more remote mobile networks that the respective SEPP is connected to, determining whether the at least one agreed interface purpose for the target remote mobile network matches an interface purpose of the at least one agreed interface purpose for the remote mobile network; and based on determining that the at least one agreed interface purpose for the target remote mobile network matches the interface purpose of the at least one agreed interface purpose for the remote mobile network, selecting the respective SEPP; and transmitting, a response to the discovery request, the response comprising the information about each respective SEPP that is selected.

9. The method of claim 8, further comprising:

receiving a subscription for notification of changes to the information about the least one SEPP.

10. The method of claim 9, further comprising:

receiving, from the at least one SEPP, an indication of an update to at least one of the at least one agreed interface purpose per remote mobile network that the at least one SEPP is connected to; and transmitting a notification of the change to the information about the at least one SEPP.

11. The method of claim 9, further comprising:

receiving, from a SEPP of the plurality of SEPP other than the at least one SEPP that is selected, an indication of an update to at least one of the at least one agreed interface purpose per remote mobile network that the SEPP is connected to; and transmitting a notification of the change to the information about the SEPP.

12. The method of claim 9, wherein the operations further comprise:

receiving, from a SEPP of the plurality of SEPP other than the at least one SEPP that is selected, an indication of a change to the at least one remote mobile network that the SEPP is connected to; and transmitting a notification of the change to the information about the SEPP.

13. The method of claim 11, wherein the operations further comprise:

receiving, from a SEPP of the plurality of SEPP other than the at least one SEPP that is selected, an indication of a change to the at least one remote mobile network that the SEPP is connected to; and transmitting a notification of the change to the information about the SEPP.

14. The method of claim 8, wherein the discovery request is received from a network function consumer or a service communication proxy associated with the network function consumer.

15. The method of claim 8, wherein the at least one agreed interface purpose per remote mobile network of the at least one mobile network that the respective SEPP is connected to comprises at least one of: roaming, inter-PLMN mobility, roaming testing, inter-PLMN mobility testing, inter-PLMN signalling, short message service, or interconnect.

* * * * *